United States Patent Office 3,163,982
Patented Jan. 5, 1965

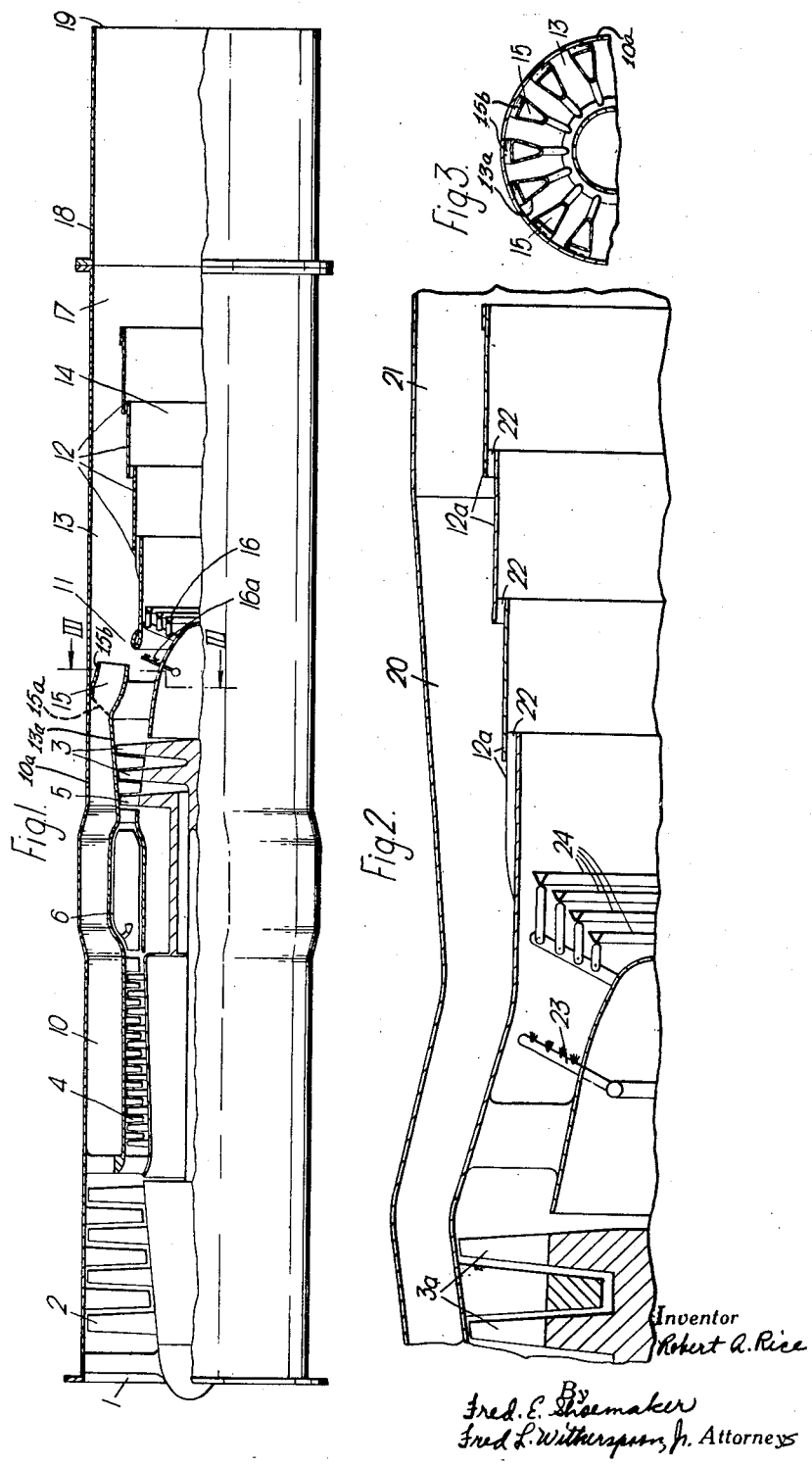

3,163,982
BY-PASS GAS TURBINE ENGINE
Robert Arthur Rice, Burton-upon-Trent, England, assignor to Rolls-Royce Limited, Derby, England, a British company
Continuation of application Ser. No. 112,899, May 26, 1961. This application July 14, 1964, Ser. No. 384,031
Claims priority, application Great Britain, June 11, 1960, 20,618/60
5 Claims. (Cl. 60—35.6)

This application is a continuation of application Serial No. 112,899 filed May 26, 1961, and entitled "By-pass Gas Turbine Engine," now abandoned.

This invention relates to by-pass gas turbine engines and includes within its scope both front and rear fan ducted fan engines.

According to the present invention there is provided a by-pass gas turbine engine comprising in flow series compressor means, combustion equipment, and turbine means, a jet pipe through which the turbine exhaust gases are directed to atmosphere, a by-pass passage which is arranged to receive part of the air compressed by the compressor means, the by-pass passage being such that by-pass air flowing therethrough by-passes the combustion equipment and turbine means and is directed to an area where it is mixed with the turbine exhaust gases, and means for burning reheat fuel in said turbine exhaust gases, or in at least a portion thereof, before the latter is mixed with the by-pass air.

The by-pass air and the turbine exhaust gases may be mixed at the extreme downstream end of the jet pipe or at some intermediate point between the downstream end of the turbine means and the downstream end of the jet pipe.

Means may be provided for dividing the turbine exhaust gases into two portions one of which is mixed with the by-pass air, the other portion of the turbine exhaust gases being separated from the area in which this mixing occurs, and the reheat fuel being burnt in the said other portion only.

A substantially cylindrical shield may be mounted within the jet pipe and may be spaced therefrom by an annular space which communicates with or forms part of the by-pass passage, the reheat fuel being burnt within said shield.

The said means for dividing the turbine exhaust gases into two portions may comprise the said shield, the portion of the turbine exhaust gases which is mixed with the by-pass air passing through the said annular space, and the said other portion of the turbine exhaust gases passing inwardly of the shield having reheat fuel burnt therein.

Preferably there are means for mixing the by-pass air with the first-mentioned portion of the turbine exhaust gases either adjacent to or slightly upstream of the upstream end of the shield.

Means may be provided for directing a small percentage of the by-pass air onto the internal surface of the shield so as to cool the latter. Thus the shield may be made of a series of overlapping sections with annular gaps between the sections to admit a film of by-pass air for cooling the said internal surface.

The invention is illustrated, merely by way of example, in the drawings accompanying the specification, FIGURES 1 and 2 of which show two embodiments of the invention as applied to a twin-spool by-pass gas turbine engine, i.e. a by-pass gas turbine engine having a low pressure compressor driven by a low pressure turbine and a high pressure compressor driven by a high pressure turbine and FIGURE 3 of which is a section taken on the line III—III of FIGURE 1.

Referring to FIGURES 1 and 3, a by-pass gas turbine engine comprises an air intake 1, a low pressure compressor 2 driven by a low pressure turbine 3 and supplying air to a by-pass passage 10, and a high pressure compressor 4 driven by a high pressure turbine 5. The high pressure compressor 4 supplies air via combustion chambers 6 and the turbines 3, 5 to the upstream end 11 of a jet pipe 18. A cylindrical shield or screen 12 divides the upstream end 11 of the jet pipe into two portions 13 and 14. The turbine exhaust gases flowing through the jet pipe portion 13 mix with the by-pass air which enters the jet pipe via a plurality of angularly spaced mixing chutes 15, the chutes 15 being disposed adjacent to but slightly upstream of the upstream end of the shield 12. Such chutes are formed in a generally known manner by corrugating the downstream end of the casing 13a which separates the turbine exhaust gases from the by-pass air (the upstream limit of the corrugations being denoted by the dash line 15a in FIGURE 1), cutting off the outer portions of the corrugations, welding flaps 15b between the outer cut edges of the corrugations as shown in FIGURE 3, and welding the upstream ends of the flaps 15b and the intervening circumferentially aligned outer surfaces of the corrugations to the by-pass wall 10a.

By arranging that the said hot gases mix with the by-pass air adjacent or just upstream of the upstream end of the shield 12, a zone of zero static pressure difference is created and the problem of matching the shield 12 to the particular engine is avoided.

The portion 14 of the jet pipe is used for burning additional fuel to provide reheat. A conventional circular array of reheat gutters 16 and fuel injectors 16a is employed to burn the reheat fuel in the turbine exhaust gases passing inwardly of the shield 12. The additional heat so obtained causes an increase in the thrust available from the turbine exhaust gases flowing through the shield 12.

At the downstream end 17 of the shield 12 the two streams of gases are mixed, i.e., the mixture of by-pass air and turbine exhaust gases may be mixed with the remaining turbine exhaust gases in which reheat fuel has been burned. The combined gases then pass out through the remainder of the jet pipe 18 and through a jet nozzle 19 at the downstream end thereof.

The remaining parts of the gas turbine engine are of conventional construction and will not be described in detail.

The arrangement shown in FIGURE 1 is particularly advantageous in advanced civil air transport engines where reheat is required to augment thrust under cruise conditions but the degree of reheat required is fairly low.

In the particular embodiment shown in FIGURE 1 the proportion of jet gases flowing in the jet pipe portion 14 is 25%, 75% of the gases flowing in the portion 13.

By comparison, the mass flow through the by-pass passage 10 is 104% of the jet gas flow and thus the flow through the portion 14 is only about 12.3% of the total mass flow. The efficiency of mixing is not very greatly affected by using this amount of jet gases in which to burn the reheat fuel.

The engine shown in FIGURE 1 has the following advantages over by-pass gas turbine engines in which reheat fuel is burnt downstream of the by-pass turbine exhaust gas mixing area:

(1) If a thrust reverser (not shown) is employed it will be cooler, and the jet nozzle 19 will also be cooler.

(2) The length of the jet pipe 18 may be less since mixing and burning can proceed over the same length of jet pipe.

(3) Only short mixing chutes 15 need be employed since the chutes 15 do not have to direct the by-pass air into the center of the jet pipe.

(4) There is less disturbance of the portion of the turbine exhaust gases in which reheat fuel is being burnt.

(5) A more robust assembly can be made with better support for the shield 12.

(6) The shield 12 can be made longer and can be cooled more effectively.

(7) Better vaporization of the reheat fuel occurs in the portion of the turbine exhaust gases passing inwardly of the shield 12, whereby there is improved combustion stability and higher combustion efficiency.

In FIGURE 2, the rear section of a similar twin-spool by-pass gas turbine engine is shown, the main difference being that under reheat conditions approximately 95% of the by-pass air does not mix with the turbine exhaust gases.

The engine is provided with a low pressure turbine 3a corresponding to the low pressure turbine 3 of FIGURE 1, the part of the engine (not shown) upstream of the turbine 3a being identical to the arrangement shown in FIGURE 1.

Mixer chutes are not essential in the embodiment of FIGURE 2 since 95% of the by-pass air passes along the entire length of by-pass passage 20 before passing through the jet nozzle 21 at the downstream end of the jet pipe.

A shield 12a keeps the turbine exhaust gases separate from the by-pass air. The shield 12a comprises a number of parts separated by corrugated spacers with gaps 22 between adjacent parts to allow a film of by-pass air to flow along the inner surfaces of the shield 12a so as to cool it. About 5% of the by-pass air is used for this purpose.

Reheat fuel is burned in the turbine exhaust gases by means of a reheat burner system consisting of a fuel injector 23 and gutters 24.

The embodiment of the invention shown in FIGURE 2 is used when by-pass mixers are not employed and most of all of the turbine exhaust gases are reheated. Mixing devices may however be included in the design if mixing of the by-pass and turbine exhaust gases is required under non-reheat conditions. In such an arrangement valve means may be provided so as to direct by-pass air either to a rearwardly facing nozzle or into the turbine exhaust gas stream.

I claim:

1. A by-pass gas turbine engine comprising in flow series, compressor means, combustion equipment, and turbine means, a jet pipe through which the turbine exhaust gases are directed to atmosphere, means forming a by-pass passage arranged to receive through its upstream end part of the air compressed by the compressor means to direct the same to by-pass the combustion equipment and turbine means, a partition casing disposed radially inwardly of said jet pipe and forming an inner wall of said by-pass passage, the upstream end of said partition casing being positioned downstream of said turbine means so that turbine exhaust gases flow inwardly and outwardly of the partition casing, the by-pass passage communicating with the space between the jet pipe and the partition casing so that the by-pass air mixes with the turbine exhaust gases flowing outwardly of the partition casing, reheat fuel injector means disposed inwardly of the upstream end of the partition casing for injecting reheat fuel solely into the interior of the partition casing for combustion in the turbine gases flowing therethrough, said partition casing having ports disposed along its length arranged to direct part of the by-pass air free of any reheat fuel from the by-pass passage into the interior of the partition casing to effect film cooling thereof, the downstream end of the jet pipe commingling the remainder of the by-pass air with the gases emerging from the downstream end of the partition casing.

2. A by-pass gas turbine engine comprising in flow series, compressor means, combustion equipment, and turbine means, a jet pipe through which the turbine exhaust gases are directed to atmosphere, means forming a by-pass passage arranged to receive part of the air compressed by the compressor means to direct the same to by-pass the combustion equipment and turbine means, inner and outer casings disposed downstream of said turbine means and defining an annular passage therebetween for the turbine exhaust gases, said means forming said by-pass passage including a by-pass wall disposed outwardly of said outer casing, a partition casing whose upstream end is so disposed relative to said inner and outer casings that the turbine exhaust gases flow inwardly and outwardly of the partition casing, said outer casing being connected to said by-pass wall and having an apertured portion disposed radially outwardly of the said upstream end of the partition casing, the by-pass passage communicating with said apertured portion so that by-pass air mixes with the turbine exhaust gases flowing outwardly of the partition casing, reheat fuel injector means disposed inwardly of the upstream end of the partition casing for injecting reheat fuel solely into the interior of the partition casing for combustion in the turbine gases flowing therethrough, said partition casing having ports disposed along its length arranged to direct part of the reheat-fuel-free by-pass air/turbine exhaust gas mixture passing outwardly of the partition casing into the interior of the partition casing to effect film cooling thereof, and means to mix the remainder of said gas mixture with the gases emerging from the downstream end of the partition casing.

3. A by-pass gas turbine engine as claimed in claim 2 in which said apertured portion of the outer casing comprises a plurality of angularly spaced chutes between which the turbine exhaust gases pass to flow outwardly of the partition casing, and through which the by-pass air flows, the downstream ends of said chutes being disposed radially outwardly of the upstream end of the partition casing.

4. A by-pass gas turbine engine comprising in flow series, compressor means, combustion equipment, and turbine means, a jet pipe through which the turbine exhaust gases are directed to atmosphere, means forming a by-pass passage arranged to receive through its upstream end part of the air compressed by the compressor means to direct the same to by-pass the combustion equipment and turbine means, a partition casing disposed radially inwardly of the jet pipe and spaced downstream of the turbine means so that turbine exhaust gases may flow inwardly and outwardly of the partition casing, the by-pass passage communicating with the space between the jet pipe and the partition casing so that the by-pass air mixes with the turbine exhaust gases flowing outwardly of the partition casing, and reheat fuel injector means disposed inwardly of the upstream end of the partition casing for for injecting reheat fuel solely into the interior of the partition casing for combustion in the gases flowing therethrough.

5. A by-pass gas turbine engine comprising in flow series, compressor means, combustion equipment, and turbine means, a jet pipe through which the turbine exhaust gases are directed to atmosphere, means forming a by-pass passage arranged to receive through its upstream end part of the air compressed by the compressor means to direct the same to by-pass the combustion equipment and turbine means, a partition casing disposed radially inwardly of the jet pipe and spaced downstream of the turbine means so that turbine exhaust gases may flow inwardly and outwardly of the partition casing, the by-pass passage communicating with the space between the jet pipe and the partition casing so that the by-pass air mixes with the turbine exhaust gases flowing outwardly of the partition casing, and reheat fuel injector means disposed inwardly of the upstream end of the partition casing for for injecting reheat fuel solely into the interior of the partition casing for combustion in the gases flowing therethrough, the cross sectional area of the partition casing in relation to the cross sectional area of the space between the jet pipe and the partition casing being such that of the order of 25% of the total quantity of turbine exhaust gases flow through the interior of the partition casing, the remainder of said turbine exhaust gases flowing through the said space between the jet pipe and the partition casing.

No references cited.

SAMUEL LEVINE, *Primary Examiner.*